(12) United States Patent
Lazzarin et al.

(10) Patent No.: US 10,508,414 B2
(45) Date of Patent: Dec. 17, 2019

(54) SYSTEM AND METHOD FOR LAYING AN UNDERWATER PIPELINE ON A BED OF A BODY OF WATER

(71) Applicant: SAIPEM S.p.A., San Donato Milanese (IT)

(72) Inventors: Diego Lazzarin, Treviso (IT); Alessio Mameli, San Donato Milanese (IT)

(73) Assignee: SAIPEM S.P.A., San Donato Milanese (IT)

( * ) Notice: Subject to any disclaimer, the term of this patent is extended or adjusted under 35 U.S.C. 154(b) by 0 days.

(21) Appl. No.: 15/513,083

(22) PCT Filed: Sep. 25, 2015

(86) PCT No.: PCT/IB2015/057397
§ 371 (c)(1),
(2) Date: Mar. 21, 2017

(87) PCT Pub. No.: WO2016/046805
PCT Pub. Date: Mar. 31, 2016

(65) Prior Publication Data
US 2017/0292246 A1    Oct. 12, 2017

(30) Foreign Application Priority Data

Sep. 25, 2014  (IT) .............................. MI2014A1674

(51) Int. Cl.
*E02F 5/10* (2006.01)
*E02F 5/04* (2006.01)
(Continued)

(52) U.S. Cl.
CPC ................ *E02F 5/104* (2013.01); *E02F 5/04* (2013.01); *E02F 5/109* (2013.01); *E02F 5/14* (2013.01);
(Continued)

(58) Field of Classification Search
CPC ... E02F 5/104; E02F 5/145; E02F 5/00; E02F 5/04; E02F 5/109; E02F 5/14; E02F 9/00;
(Continued)

(56) References Cited

U.S. PATENT DOCUMENTS 3,849,997 A * 11/1974 Gower ...................... F16L 1/14
                                                   114/293
3,900,146 A *  8/1975 Fowler ................. B23K 37/053
                                                   228/103
(Continued)

FOREIGN PATENT DOCUMENTS

EP    1 022 501      7/2000
GB    2 267 945     12/1993
(Continued)

OTHER PUBLICATIONS

Trailblazer Pipeline Company et al., "Trailblazer Pipeline System Draft Environmental Impact Statement", Federal Energy Regulatory Commission Office of Pipeline and Producer Rgulation, p. 9. (Year: 1980).*
(Continued)

*Primary Examiner* — Carib A Oquendo
(74) *Attorney, Agent, or Firm* — Neal, Gerber & Eisenberg LLP (57) ABSTRACT

A system for laying an underwater pipeline on a bed of a body of water has a construction site to form a string of an underwater pipeline, the string being defined by a curved portion shaped substantially like a portion of the bed of the body of water characterized by an abrupt change in slope; at least two vessels to transfer, in the body of water, the string from the construction site to a laying site in the body of water and substantially on the vertical of a path along which to lay the string; and a plurality of floating devices configured to be coupled to the string and so as to selectively support and sink the string in the body of water, and
(Continued)

progressively lay the string along the path on the bed of the body of water.

22 Claims, 4 Drawing Sheets

(51) Int. Cl.
| | |
|---|---|
| *E02F 5/14* | (2006.01) |
| *E02F 9/28* | (2006.01) |
| *F16L 1/16* | (2006.01) |
| *E02F 5/00* | (2006.01) |
| *E02F 9/00* | (2006.01) |

(52) U.S. Cl.
CPC .............. *E02F 9/2866* (2013.01); *F16L 1/16* (2013.01); *E02F 5/00* (2013.01); *E02F 9/00* (2013.01)

(58) Field of Classification Search
CPC ..... F16L 1/20; F16L 1/235; F16L 1/24; F16L 1/165; F16L 1/16
USPC ......... 405/156, 158, 168.5, 171, 172, 184.4, 405/203, 205
See application file for complete search history.

(56) References Cited

U.S. PATENT DOCUMENTS

| | | | | |
|---|---|---|---|---|
| 4,041,719 | A * | 8/1977 | Baugh | B63C 11/40 405/169 |
| 4,147,455 | A | 4/1979 | Bertaccini | |
| 4,909,670 | A * | 3/1990 | Harrison | F16L 1/16 254/134.3 SC |
| 7,993,077 | B2 * | 8/2011 | Alliot | B63B 21/66 114/253 |
| 2009/0214298 | A1 * | 8/2009 | Brown | F16L 1/20 405/171 |
| 2012/0257930 | A1 * | 10/2012 | Persson | F16L 1/123 405/168.1 |
| 2014/0093317 | A1 | 4/2014 | Restivo et al. | |
| 2016/0091132 | A1 * | 3/2016 | Suzuki | F16L 1/24 405/184.4 |

FOREIGN PATENT DOCUMENTS

| | | |
|---|---|---|
| NO | 158234 | * 10/1985 |
| WO | WO 93/22592 | * 11/1993 |
| WO | WO 94/08166 | 4/1994 |
| WO | WO 2006/117249 | 11/2006 |
| WO | WO 2011/061605 | 5/2011 |

OTHER PUBLICATIONS

Notification Concerning Submission, Obtention or Transmittal of Priority Document for International Application No. PCT/IB2015/057397 dated Jan. 12, 2016.
International Search Report and Written Opinion for International Application No. PCT/IB2015/057397 dated Jan. 21, 2016.
PCT Demand for International Preliminary Examination and Reply to International Search Report and the associated Written Opinion for International Application No. PCT/IB2015/057397 dated Jul. 22, 2016.
Notification of Receipt of Demand by Competent International Preliminary Examining Authority (Form PCT/IPEA/402) for International Application No. PCT/IB2015/057397 dated Aug. 1, 2016.
Second Written Opinion of the International Preliminary Examining Authority for International Application No. PCT/IB2015/057397 dated Aug. 31, 2016.
Reply to the Second Written Opinion of the International Searching Authority for International Application No. PCT/IB2015/057397 dated Oct. 27, 2016.
Notification of Transmittal of the International Preliminary Report on Patentability (Form PCT/IPEA/416) for International Application No. International Application No. PCT/IB2015/057397 dated Jan. 24, 2017.

* cited by examiner

SYSTEM AND METHOD FOR LAYING AN UNDERWATER PIPELINE ON A BED OF A BODY OF WATER

PRIORITY CLAIM

This application is a national stage application of PCT/IB2015/057397, filed on Sep. 25, 2015, which claims the benefit of and priority to Italian Patent Application No. MI2014A001674, filed on Sep. 25, 2014, the entire contents of which are each incorporated by reference herein.

BACKGROUND

It is known that once an underwater pipeline is laid on the bed of the body of water, it assumes a configuration imposed by the points or areas that support the underwater pipeline. The laying of an underwater pipeline consequently envisions an accurate preliminary study for a path that avoids the underwater pipeline having spanned portions or spanned portions of excessive length once laid.

EP Patent No. 1,022,501 and PCT Patent Application No. WO 2006/117,249 disclose a technique of laying on a bed of body of water a prefabricated string of a pipeline by variable buoyancy devices, wherein the flexibility of the string enables adaptation to the profile of the bed of the body of water. However, the capability of deformation of the pipeline does not guarantee that the pipeline can follow any profile of the bed.

Sometimes, the preferable path has portions along which ridges and depressions alternate or an escarpment is encountered. In these cases, the morphology of the bed imposes carrying out specific operations to reduce the length of any such spans. A known technique is to carry out operations preparatory to laying the underwater pipeline, such as flattening out the ridges and filling the depressions for example.

In other cases where the bed of the body of water does not have significant discontinuities, it is sufficient to dig a trench in such a way as to create a bathymetric profile for the bottom of the trench as even as possible, as shown in PCT Patent Application NO. WO 2011/061,605 and in the name of the applicant.

Another known technique aimed at rectifying bathymetric profiles characterized by marked variability provides for arranging at least one support in a depression between two successive ridges to provide a further point of support for the underwater pipeline and reduce the length of the free-span portion of the underwater pipeline.

A support of the above-indicated type shown in U.S. Patent Application No. 2014/093317. This support is preliminarily arranged in a given zone of the bed of the body of water and comprises a vertical structure, a carriage selectively movable in a vertical direction along the vertical structure, and a cradle configured to accommodate the underwater pipeline. The underwater pipeline is positioned in the cradle, which is selectively set at a desired height with respect to the bed of the body of water.

A support, based on a similar principle to the previous one is described in U.S. Pat. No. 4,147,455.

PCT Patent Application No. WO 94/08166 shows a straddle carrier, which is laid on the bed straddling the underwater pipeline and is provided with a gripper element capable of grasping a portion of the underwater pipeline and raising this portion until this portion reaches a desired height.

The described supports must be arranged inside a predetermined area and the underwater pipeline must then be coupled to the support.

These operations are relatively costly in terms of time and complicate the laying operations of the underwater pipeline.

All of the described methodologies offer respective advantages and disadvantages and can be conveniently applied depending on the operating conditions encountered in the laying sites, such as depth, morphology, geological structure of the bed of the body of water and the prevailing sea and weather conditions.

SUMMARY

The present disclosure relates toe system configured to an underwater pipeline on a bed of a body of water.

In particular, the present disclosure relates to a system configured to lay an underwater pipeline along a path on a bed of the body of water affected by abrupt bathymetric changes, such as escarpments.

The advantage of the present disclosure is to provide an alternative system to those known so as to broaden the range of possible technical solutions.

In accordance with the present disclosure, a system is provided for laying an underwater pipeline along a path on the bed of a body of water, the system comprising a construction site to form a string of an underwater pipeline by joining together a curved portion and straight pieces of pipe so that the string includes at least one curved portion shaped substantially like a portion of the bed of the body of water characterized by an abrupt change in slope; at least two vessels to transfer, in the body of water, the string from the construction site to a laying site in the body of water and on the vertical of a path along which to lay the string; a plurality of floating devices configured to be coupled to the string and so as to selectively support and sink the string in the body of water, and progressively lay the string along the path on the bed of the body of water; a stabilizer device, configured to be coupled to the curved portion of the string and to prevent deformation of the curved portion of the string.

It should be appreciated that in accordance with the present disclosure, it is possible to directly arrange the string on the bed of the body of water to copy the bathymetric profile of the bed of the body of water even when there are abrupt changes in slope. In this way, earth-moving operations on the bed of the body of water or positioning supports along the body of water are not needed. In this way, the stabilizer device is able to, absorb part of the stress induced on the curved portion and prevent plastic deformation occurring in the curved portion.

In particular, two vessels comprise respective traction element configured to be connected to the opposite ends of the string. In this way, it is possible to control the position and the orientation of the string in the body of water and arrange the string in the correct position above the path in the exact point where the string must be laid.

In accordance with the present disclosure, the vessels comprise respective winches configured to be connected to the opposite ends of the string.

In particular, the two vessels are equipped with suitable, mooring or dynamic positioning systems that comprise respective winches configured to be connected to the opposite ends of the string. In this way, the winches, due to their responsiveness, contribute to controlling the position and orientation of the string in a rapid and efficient manner and compensating possible movements of the vessels, which have a certain inertia in performing manoeuvres.

In accordance with the present disclosure, each floating device has variable buoyancy.

The variation in buoyancy enables supporting, sinking and defining a plurality of equilibrium positions of the string in the body of water.

In particular, each floating device can be selectively decoupled from the string. In this way, it is possible to let the string sink and/or recover the floating device.

In particular, each floating device is configured to vary the distance between the floating device and the string. In this way it also is possible to sink the string without altering the buoyancy of the floating devices.

In accordance with the present disclosure, each floating device can be controlled independently of the other floating devices. In this way, it is possible to first lay some portions of the string and, subsequently, other portions of the string.

In particular, the change in buoyancy of each floating device is obtained by flooding each floating element in a controlled manner so as to achieve controlled sinking of the string.

In accordance with the present disclosure, the system comprises a further vessel comprising a traction element that can be connected to a curved portion of the string.

It should be appreciated that such a further vessel provides that it is possible to control the shape of the string in the construction and transfer steps and therefore prevent undesired deformation. In addition, the further vessel controls the string in the step of rotating the string from the horizontal plane to the vertical plane.

In particular, the further vessel comprises a further winch configured to be connected to the curved portion of the string. In this way, the further winch is able to compensate any inertia of the further vessel.

In accordance with the present disclosure, the system comprises an ROV connected to the further vessel and configured to control the operations of laying the string on the bed of the body of water.

In accordance with the present disclosure, in the case where required by sea/weather conditions, such as in the event of strong currents, the system comprises a guide device comprising ballast configured to be placed on the bed of the body of water and a guide constrained by the ballast and by the string to limit the positioning tolerance of the string with respect to the path in the step of laying the string.

A further advantage of the present disclosure is to provide an alternative method for laying an underwater pipeline with respect to certain of the known methods.

In accordance with the present disclosure, a method is provided for laying an underwater pipeline along a path on the bed of a body of water, the method comprising the steps of assembling a string of an underwater pipeline at a construction site by joining together a curved portion and straight pieces of pipe so that the string includes at least one curved portion shaped substantially like a portion of the bed of the body of water characterized by an abrupt change in slope; transferring, in the body of water, the string from the construction site to a laying site in the body of water an the vertical of a path along which to lay the string; sinking the string in the body of water; laying the string along the path on the bed of the body of water; and coupling the curved portion of the string to a stabilizer device, configured to prevent deformation of the curved portion of the string. In this way, it is possible to copy the shape of the bed, including parts characterized by abrupt changes in slope. In this way, harmful deformation of the curved portion is minimized or prevented.

In accordance with the present disclosure, in the transfer step, the string lies in the body of water substantially on a horizontal plane close to the free surface of the body of water. In this way, stress is reduced during the transfer step.

In accordance with the present disclosure, the method provides for arranging the string substantially along a vertical plane in the body of water.

In practice, the string is made to face the path in the area where the string is to be laid.

In particular, the method provides for laying in succession on the bed of the body of water the curved portion and progressively two straight portions, possibly arranged on opposite sides of the curved portion.

In practice, the method provides for connecting the string to a plurality of vessels to implement the steps of constructing, transferring, rotating, sinking and laying the string. In this way, it is possible to move the string in the body of water.

In accordance with the present disclosure, the method provides for coupling a plurality of floating devices to the string to perform the steps of constructing, transferring, rotating, sinking and laying the string. In this way, the movements of the string in the body of water are facilitated, in particular when the floating devices are distributed along the string.

Additional features and advantages are described in, and will be apparent from the following Detailed Description and the figures.

BRIEF DESCRIPTION OF THE DRAWINGS

Further characteristics and advantages of the present disclosure will become clear from the description below of certain embodiments, with reference to the figures in the accompanying drawings, in which.

DETAILED DESCRIPTION

Figure 1:
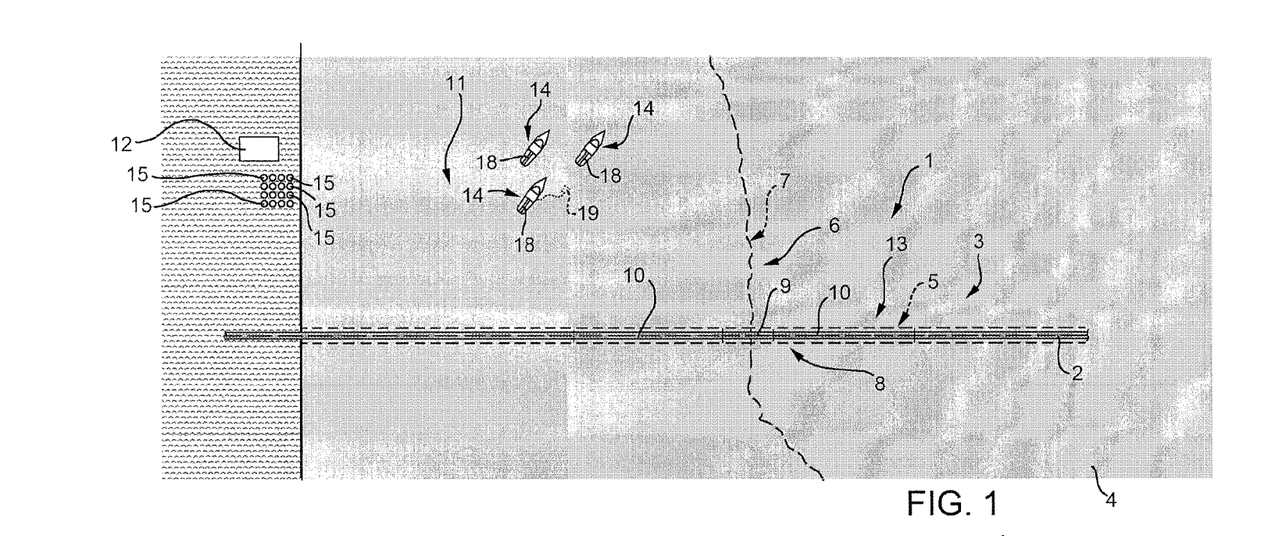
FIG. 1 is an elevation view, with parts shown schematically and parts removed for clarity, of a system configured to lay an underwater pipeline positioned in an operating field.

Referring now to the example embodiments of the present disclosure illustrated in FIGS. 1 to 13, referring to FIG. 1, a system 1 is shown, as whole, for laying an underwater pipeline 2 on a bed 3 of a body of water 4 along a predefined path 5.

Figure 2:
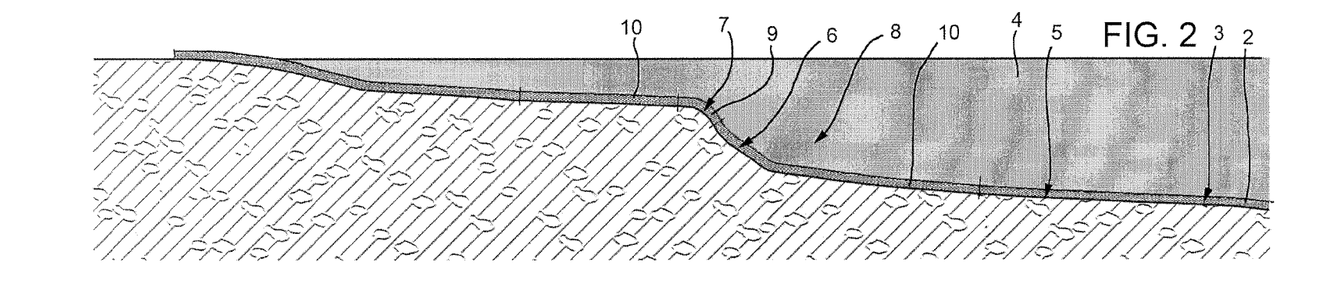
FIG. 2 is a side elevation view, with parts removed for clarity; of an underwater pipeline lying on the bed of a body of water.

With reference to the case shown in FIG. 2, the bed 3 of the body of water 4 comprises an escarpment 6, which has an upper edge 7 characterized by an abrupt change in slope.

The system 1 is configured to form a string 8 of the underwater pipeline 2, lay the string 8 and successively complete the underwater pipeline 2.

The string 8 includes a curved portion 9 shaped substantially like a portion of the bed 3 of the body of water 4 characterized by an abrupt change in slope. In the case shown, the curved portion 9 is shaped to substantially follow the abrupt change in slope of the bed 3 at the upper edge 7 of the escarpment 6. In the case shown, the string 8 comprises two straight portions 10 joined to the curved portion 9 on opposite sides. The portions 10 are defined "straight" because they are made straight. However, the straight portions 10 have a certain flexibility that enable them to assume curved configurations with broad radii of curvature so as not to cause plastic deformation of the string 8. As such, once laid on the bed 3 of the body of water 4, the straight portions 10 follow the profile of the bed 3 without exceeding the permissible deformation values and may also bend without exceeding the deformation limits in the transfer and laying steps.

Figures 3, 4, 5, 6, 7:
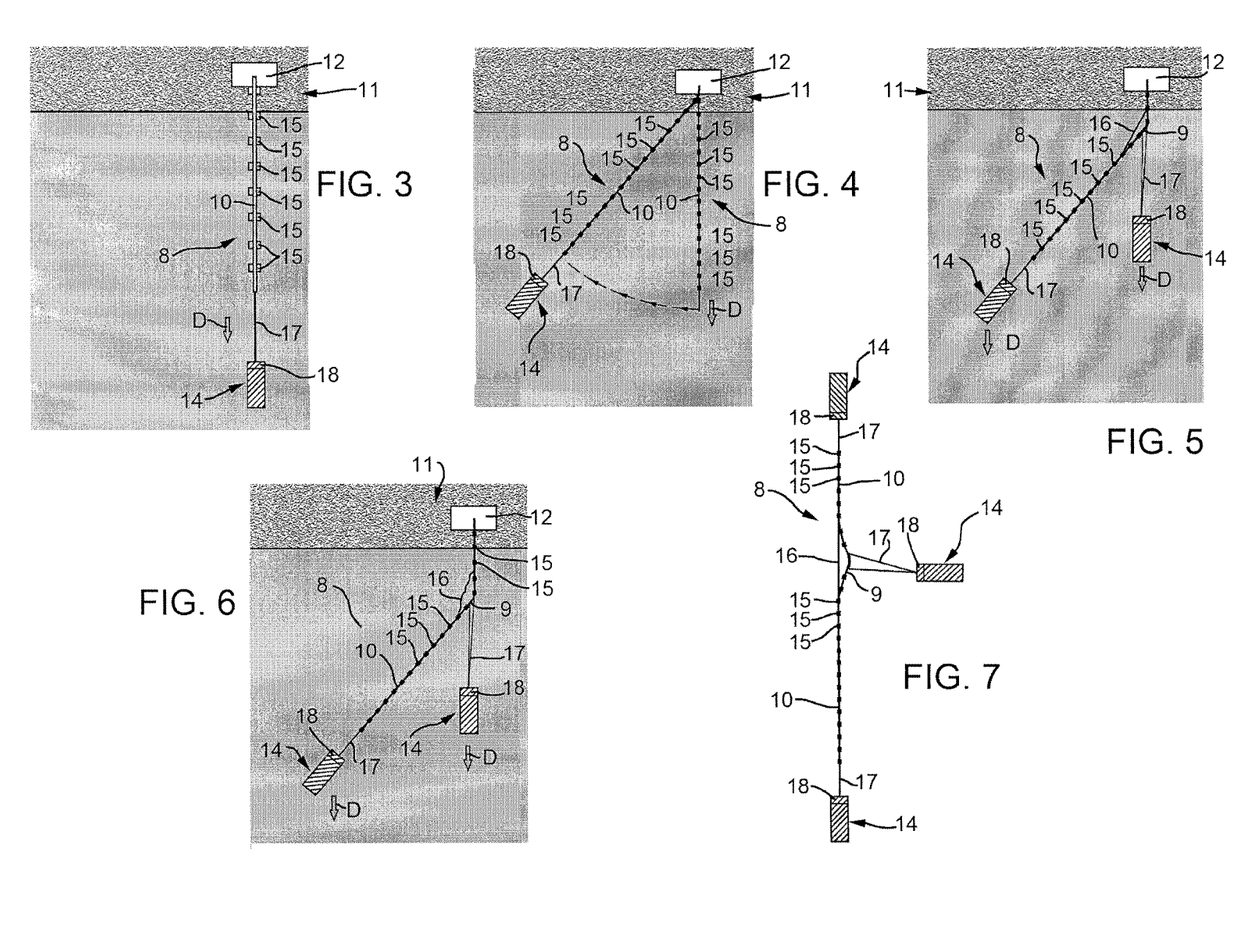
FIGS. 3 to 6 are plan views, in a reduced scale with parts removed for clarity, of a construction site of a string of the underwater pipeline.
FIG. 7 is a plan view, with parts removed for clarity, of a transfer step of the string in the body of water.

Referring to FIG. 1, the system 1 comprises a construction site 11, where the curved portion 9 (FIG. 2) and straight pieces of pipe (not shown in the accompanying figures) are joined together to form the string 8 (FIG. 2). The joining operations envision preparation of the ends, welding and the application of a protective coating on the weld (i.e., field joint coating). The construction site 11 thus comprises an assembly line 12 and can be positioned on shore or in the body of water 4 close to the shore or part on shore and part in the body of water 4. Referring to FIG. 3, the assembly line 12 is positioned on shore, while, during construction, the string 8 leaving the assembly line 12 is positioned in the body of water 4.

Referring to FIG. 1, the system 1 comprises a laying site 13, which is located in the body of water 4 over the path 5 wherein it is intended to lay the string 8.

The transfer of the string 8 from the construction site 11 to laying site 13 is carried out in the body of water 4. The construction and transfer of the string 8 envision vessels 14 that are connected to the string 8. The system 1 also comprises floating devices 15 configured to be distributed along the string 8 and to selectively support and sink the string 8 in the body of water 4.

Referring to FIGS. 5 to 7, the system 1 comprises a stabilizer device 16 configured to be coupled to the curved portion 9 of the string 8 and to prevent deformation along the curved portion 9 of the string 8. In certain embodiments, the stabilizer device 16 comprises a stay wire that defines a chord of the curved portion 9 and is connected to the string 8. In particular, the stay wire comprises at least one steel or textile cable or at least one bar or chain and is connected to the curved portion 9 by constraints, such as clamps or eyebolts.

In particular, in the step of transferring the string 8, two vessels 14 are connected by respective traction elements 17 to the opposite ends of the string 8. The two vessels 14 comprise respective winches 18 configured to control the respective traction elements 17.

In the step of rotating the string 8, a further vessel 14 is connected to the curved portion 9 of the string 8 by a traction element 17. The traction element can be connected to the same constraints to which the stabilizer device 16 is connected. The further vessel 14 comprises a further winch 18 to control the traction element 17.

The floating devices 15 have variable buoyancy so as to be able to vary the position of the string 8 in the body of water.

The floating devices 15 can be selectively uncoupled from the string 8.

In particular, each floating device 15 can be controlled independently of the other floating devices 15. In practice, the buoyancy of each floating device 15 is controlled independently of the other floating devices 15.

Furthermore, the release of each floating device 15 from the string 8 can also be controlled and performed independently of the other floating devices 15.

Each floating device 15 is connected to the string 8 by a stay wire, the length of which can be selectively varied, independently of the other floating devices 15, from a remote location. In accordance with a variant that is not shown, the floating devices are directly coupled to the string, in particular by clamps or bands.

The system 1 comprises an ROV 19 connected to the further vessel 14 and configured to control the operations of laying the string 8 on the bed 3 of the body of water 4.

The information transmitted by the ROV 19 enables controlling the step of laying the string 8 and governing the position of the vessels 14, the winches 18 and the operations of the floating devices 15.

From the operational viewpoint, the system 1 provides for laying a string 8 on the bed 3 of the body of water 4 on an edge 7 of an escarpment 6 and subsequently completing the underwater pipeline 2 by joining pieces of pipe (not shown in the accompanying figures) to the string 8 to complete the underwater pipeline 2. The completion of the underwater pipeline 2 can be performed, for example, by a laying vessel (not shown in the accompanying figures) which recovers an end of the string on board for performing the subsequent steps of assembly and laying.

Conversely, the string 8 is prefabricated on the assembly line 12 and progressively set afloat in the body of water 4, as shown in FIG. 3. The prefabrication of the string 8 provides the assembly and setting afloat in succession of a first straight portion 10, the curved portion 9 (FIG. 5), and a second straight portion 10 (FIG. 6). The floating devices 15 are coupled to the string 8 as the string 8 is assembled. In a similar manner, the stabilizer device 16 is coupled to the curved portion 9.

A vessel 14 is connected to the free end of the first straight portion 10 by a traction element 17 and the winch 18. The vessel 14 keeps the first straight portion 10 in a straight position so as to maintain the string 8 in tension during the assembly step and advances in direction D as the length of the first straight portion 10 grows.

Once the first straight portion 10 has been completed and the curved portion 9 has been joined to the first straight portion 10, the first straight portion 10 is inclined in a horizontal plane with respect to direction D, as shown in FIG. 4. The entity of the inclination is a function of the angle between the two straight portions 10 of the string 8 and, consequently, of the curved portion 9. In particular, the curved portion 9 is made by joining straight pieces with the ends opportunely shaped so as to approximate the curve with a polygonal shape. Then, the stabilizer device 16 and a vessel 14 are coupled to the curved portion 9. Both vessels 14 are advanced in direction D as the second straight portion 10 is assembled and increases in length, as shown in FIGS. 5 and 6.

Once assembly of the second straight portion 10 is completed, the free end of the second straight portion 10 is also secured to a vessel 14, as shown in FIG. 7. The straight portions 10 may also deform provided that such deformation does not exceed certain threshold values.

Figure 8:
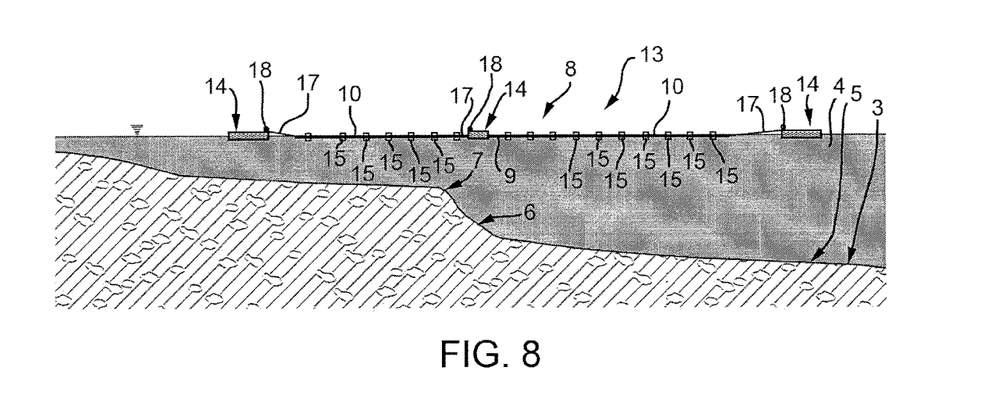
FIGS. 8 to 12, are side elevation views, with parts in section and parts removed for clarity, of successive steps of laying the string on the bed of the body of water.

Once completed, the string 8 is supported by the floating devices 15 and by the vessels 14, and is transported in the body of water 4 by the vessels 14 to the laying site 13, as show in FIG. 8. In this step, due to the support provided by the floating devices 15, the string 8 lies in the body of water 4 substantially on a horizontal plane in proximity of the free surface of the body of water 4.

In the next step, the string 8 is rotated so as to arrange the string 8 substantially on a vertical plane above the path 5. The rotation is performed by the selective and differential sinking of the string 8, and by the action of the vessel 14 connected to the curved portion 9.

Figure 9:
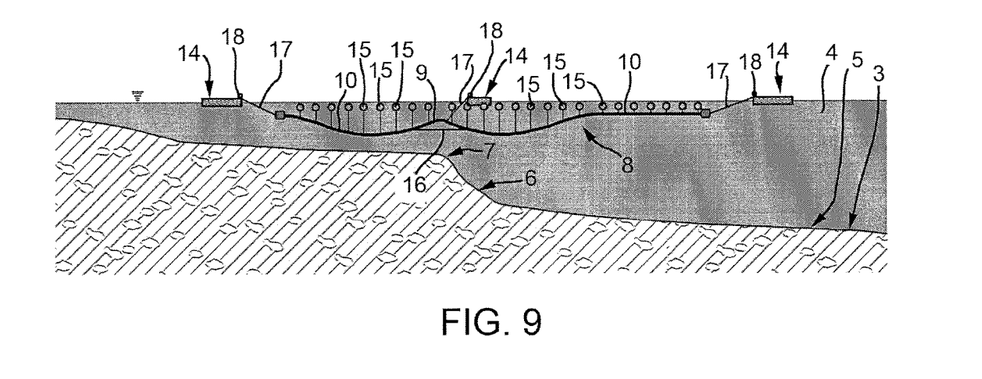

In the case shown in FIG. 9, rotation of the underwater pipeline 2 is made possible by the varying of distance between the underwater pipeline 2 and the floating devices 15. In practice, each floating device 15 is capable of varying the length of its stay wire in a remotely-controlled manner.

Alternatively, the same operation is possible by varying the buoyancy of each floating device. In particular, rotation of the string 8 is made possible by a defined sequence of varying the buoyancy or flooding of selected floating devices. The sequence enables keeping induced strain on the string 8 within acceptable limits. In certain embodiments, the shape of the string 8 is monitored during the rotation step to avoid excessive deformation. The control tools that can be used to perform this checking are acoustic instruments and structural simulation software.

Figure 10:
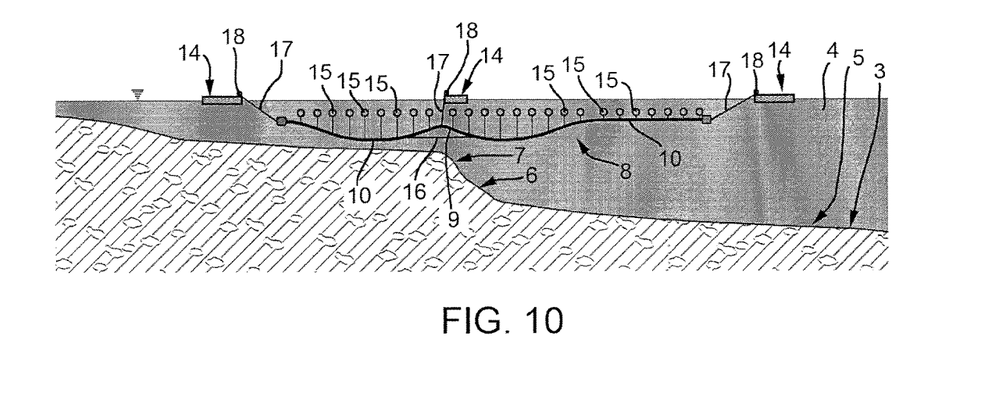

Then, the string 8 is sunk so as to progressively move the string 8 closer to the path 5. This step is performed by reducing the buoyancy of the floating devices 15, which start to sink, as shown in FIG. 10.

Figure 11:
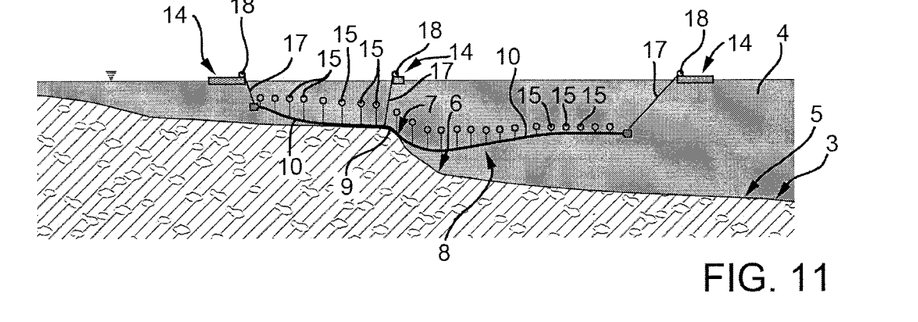
Figure 12:
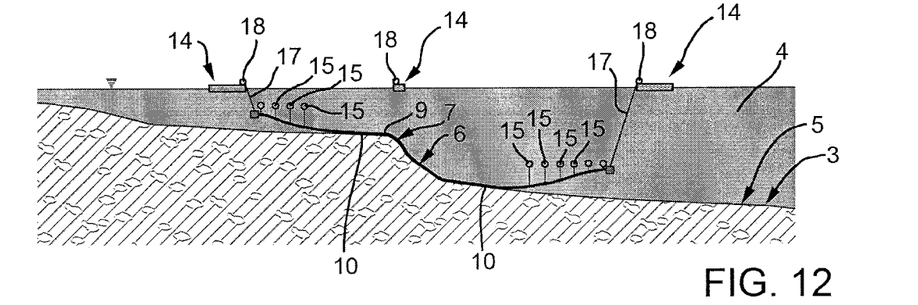
Figure 13:
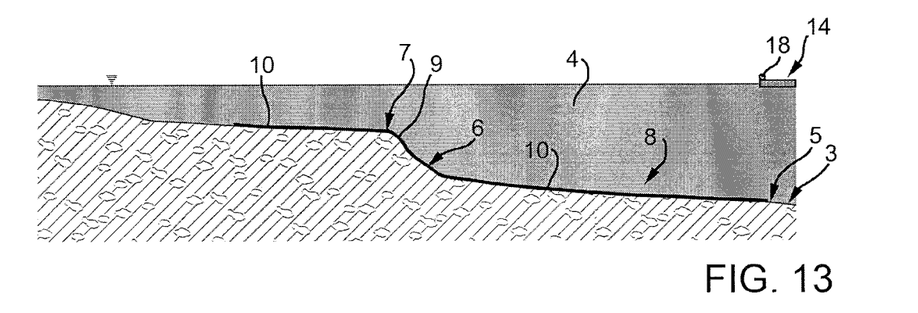
FIG. 13 is a side elevation view, with parts removed for clarity and parts in section, depicting the string laid on the bed of the body of water.

The sinking of the string 8 is selective and performed so as to initially arrange the curved portion 9 in contact with the edge 7 and successively the straight portions 10, as shown in FIGS. 11 and 12. The stabilizer device 16 is removed before the curved portion 9 touches down. As the string 8 is gradually laid, the floating devices 15 are uncoupled from the string and recovered, as shown in FIGS. 12 and 13.

Finally, it is evident that variants can be made to the present disclosure with respect to the embodiments described with reference to the accompanying drawings without departing from the scope of the appended claims. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An underwater pipeline laying system comprising:
   a plurality of floating devices configured to be coupled to a string of an underwater pipeline formed at a construction site by joining together a curved portion of pipe and two straight portions of pipe such that the string includes a curved portion having a shape corresponding to a portion of a bed of a body of water including an escarpment, wherein:
      the string is transferred, laying in the body of water substantially in a horizontal plane within a predetermined distance of a free surface of the body of water, from the construction site to a laying site in the body of water via at least three vessels including a first vessel configured to be connected to a first end of the string, a second vessel configured to be connected to a second, opposite end of the string, and a third vessel configured to be connected to the curved portion of the string,
      said laying site is aligned with a path on the bed of the body of water along which to lay the string,
      each floating device is configured to:
         selectively support the string in the body of water,
         selectively sink the string in the body of water, and
         progressively lay the string along the path on the bed of the body of water, and
      the selective sinking of the string in the body of water by the plurality of floating devices causes the string to rotate in the body of water to be substantially in a vertical plane above the path on the bed of the body of water along which to lay the string; and
   a stabilizer device comprising a stay wire having a first end configured to be coupled to a first connection point of the curved portion of the string and having a second, opposite end configured to be coupled to a second connection point of the curved portion of the string, wherein the stay wire stabilizes and prevents deformation of a shape of the curved portion of the string when the string is transferred, in the body of water, from the construction site to the laying site in the body of water.

2. The underwater pipeline laying system of claim 1, wherein the first vessel includes a first traction element configured to be connected to the first end of the string and the second vessel includes a second traction element configured to be connected to the second, opposite end of the string.

3. The underwater pipeline laying system of claim 1, wherein the first vessel includes a first winch configured to be connected to the first end of the string and the second vessel includes a second winch configured to be connected to the second, opposite end of the string.

4. The underwater pipeline laying system of claim 1, wherein each floating device has a variable buoyancy.

5. The underwater pipeline laying system of claim 1, wherein each floating device is configured to be selectively uncoupled from the string.

6. The underwater pipeline laying system of claim 1, wherein each floating device is configured to vary a distance with the string.

7. The underwater pipeline laying system of claim 1, wherein each floating device is controllable independently of the other floating devices.

8. The underwater pipeline laying system of claim 1, wherein the third vessel includes a traction element connectable to the curved portion of the string.

9. The underwater pipeline laying system of claim 8, which includes a remotely operated underwater vehicle connected to the third vessel and configured to control a laying operation of the string on the bed of the body of water.

10. The underwater pipeline laying system of claim 1, wherein the third vessel includes a winch connectable to the curved portion of the string.

11. The underwater pipeline laying system of claim 1, wherein said laying site is vertically aligned with the path along which to lay the string.

12. A method for laying an underwater pipeline on a bed of a body of water, the method comprising:
   assembling a string of an underwater pipeline at a construction site by joining together a curved portion of pipe and two straight portions of pipe such that the string includes a curved portion having a shape corresponding to a portion of the bed of the body of water including an escarpment;

connecting: (i) one end of the string to a first vessel, (ii) an opposite end of the string to a second vessel, and (iii) the curved portion of the string to a third vessel;

coupling the curved portion of the string to a stabilizer device by connecting a first end of a stay wire to a first connection point of the curved portion of the string and connecting a second, opposite end of the stay wire to a second connection point of the curved portion of the string;

transferring, in the body of water, the string from the construction site to a laying site in the body of water, said laying site being aligned with a path on the bed of the body of water along which to lay the string, wherein during the transfer, the stabilizer device stabilizes and prevents deformation of a shape of the curved portion of the string and the string lies in the body of water substantially in a horizontal plane within a predetermined distance of a free surface of the body of water;

selectively sinking, via a plurality of floating devices coupled to the string, the string in the body of water to rotate the string in the body of water and arrange the string substantially along a vertical plane above the path on the bed of the body of water along which to lay the string; and laying the string along the path on the bed of the body of water.

13. The method of claim 12, wherein laying the string on the bed of the body of water comprises arranging, in succession on the bed of the body of water, the curved portion and progressively two straight portions arranged on opposite sides of the curved portion.

14. The method of claim 12, further comprising varying the buoyancy of each floating device independently of the other floating devices.

15. The method of claim 12, further comprising uncoupling each floating device from the string independently of the other floating devices.

16. The method of claim 12, further comprising varying a distance of each floating device from the string independently of the other floating devices.

17. The method of claim 12, wherein said laying site is vertically aligned with the path along which to lay the string.

18. A method for laying an underwater pipeline on a bed of a body of water, the method comprising:

assembling a string of an underwater pipeline at a construction site by joining together a curved portion of pipe and two straight portions of pipe such that the string includes a curved portion having a shape corresponding to a portion of the bed of the body of water including an escarpment;

connecting: (i) one end of the string to a first vessel, (ii) an opposite end of the string to a second vessel, and (iii) the curved portion of the string to a third vessel;

coupling the curved portion of the string to a stabilizer device;

transferring, in the body of water, the string from the construction site to a laying site in the body of water, said laying site being aligned with a path on the bed of the body of water along which to lay the string, wherein during the transfer, the stabilizer device stabilizes and prevents deformation of a shape of the curved portion of the string and the string lies in the body of water substantially in a horizontal plane within a predetermined distance of a free surface of the body of water;

selectively sinking, via a plurality of floating devices, the string in the body of water to rotate the string in the body of water and arrange the string substantially along a vertical plane above the path on the bed of the body of water along which to lay the string; and laying the string along the path on the bed of the body of water by arranging, in succession on the bed of the body of water, the curved portion and progressively two straight portions arranged on opposite sides of the curved portion.

19. A method for laying an underwater pipeline on a bed of a body of water, the method comprising:

assembling a string of an underwater pipeline at a construction site by joining together a curved portion of pipe and two straight portions of pipe such that the string includes a curved portion having a shape corresponding to a portion of the bed of the body of water including an escarpment;

connecting: (i) one end of the string to a first vessel, (ii) an opposite end of the string to a second vessel, and (iii) the curved portion of the string to a third vessel;

coupling the curved portion of the string to a stabilizer device;

transferring, in the body of water, the string from the construction site to a laying site in the body of water, said laying site being aligned with a path on the bed of the body of water along which to lay the string, wherein during the transfer, the stabilizer device stabilizes and prevents deformation of a shape of the curved portion of the string and the string lies in the body of water substantially in a horizontal plane within a predetermined distance of a free surface of the body of water;

rotating, via a floating device, the string in the body of water at the laying site to arrange the string substantially along a vertical plane above the path on the bed of the body of water along which to lay the string;

sinking the string in the body of water; and laying the string along the path on the bed of the body of water.

20. The method of claim 19, wherein rotating the string in the body of water at the laying site comprises varying a distance between the underwater pipeline and the floating device.

21. The method of claim 19, wherein rotating the string in the body of water at the laying site comprises varying a buoyance of the floating device.

22. The method of claim 19, wherein rotating the string in the body of water at the laying site further comprises monitoring the shape of the curved portion of the string to avoid excessive deformation.

* * * * *